(12) United States Patent
Fong et al.

(10) Patent No.: US 6,663,252 B1
(45) Date of Patent: Dec. 16, 2003

(54) AUTOMOTIVE DISPLAY PANEL

(75) Inventors: Ching Fong, Canton, MI (US); Sanjiv Venkatram, Canton, MI (US)

(73) Assignee: Yazaki North America, Inc., Canton, MI (US)

( * ) Notice: Subject to any disclaimer, the term of this patent is extended or adjusted under 35 U.S.C. 154(b) by 0 days.

(21) Appl. No.: 10/058,552

(22) Filed: Jan. 28, 2002

(51) Int. Cl.$^7$ ............................................... G01D 11/28
(52) U.S. Cl. ............................. 362/29; 362/23; 116/48
(58) Field of Search ........................... 362/29, 23, 85, 362/28, 27; 116/48, 49, 54

(56) References Cited

U.S. PATENT DOCUMENTS

| | | | | |
|---|---|---|---|---|
| 3,727,041 A | * | 4/1973 | Scott | ............................ 362/29 |
| 5,911,492 A | * | 6/1999 | Perry et al. | .................... 362/26 |
| 5,997,161 A | * | 12/1999 | Stringfellow et al. | ....... 362/489 |
| 6,550,953 B1 | * | 4/2003 | Takahashi et al. | ............ 315/56 |

* cited by examiner

*Primary Examiner*—Sandra O'Shea
*Assistant Examiner*—John Anthony Ward
(74) *Attorney, Agent, or Firm*—Rader, Fishman & Grauer PLLC

(57) ABSTRACT

An automotive display panel having a plurality of clear plastic substrates, wherein color-printed inks or foils are imprinted on the substrates. Each plastic substrate includes digits and identifying marks in selected areas. After creating a metallic-looking finish on the substrates, finely configured lines, such as concentric circles or radial lines, are printed on the color-tinted layer to create a desired appearance. Thereafter,,when the printing is completed, the substrates may be formed in multi-level configurations for providing a three-dimensional appearance. Backlighting is also provided to illuminate the selected areas of the substrates.

14 Claims, 2 Drawing Sheets

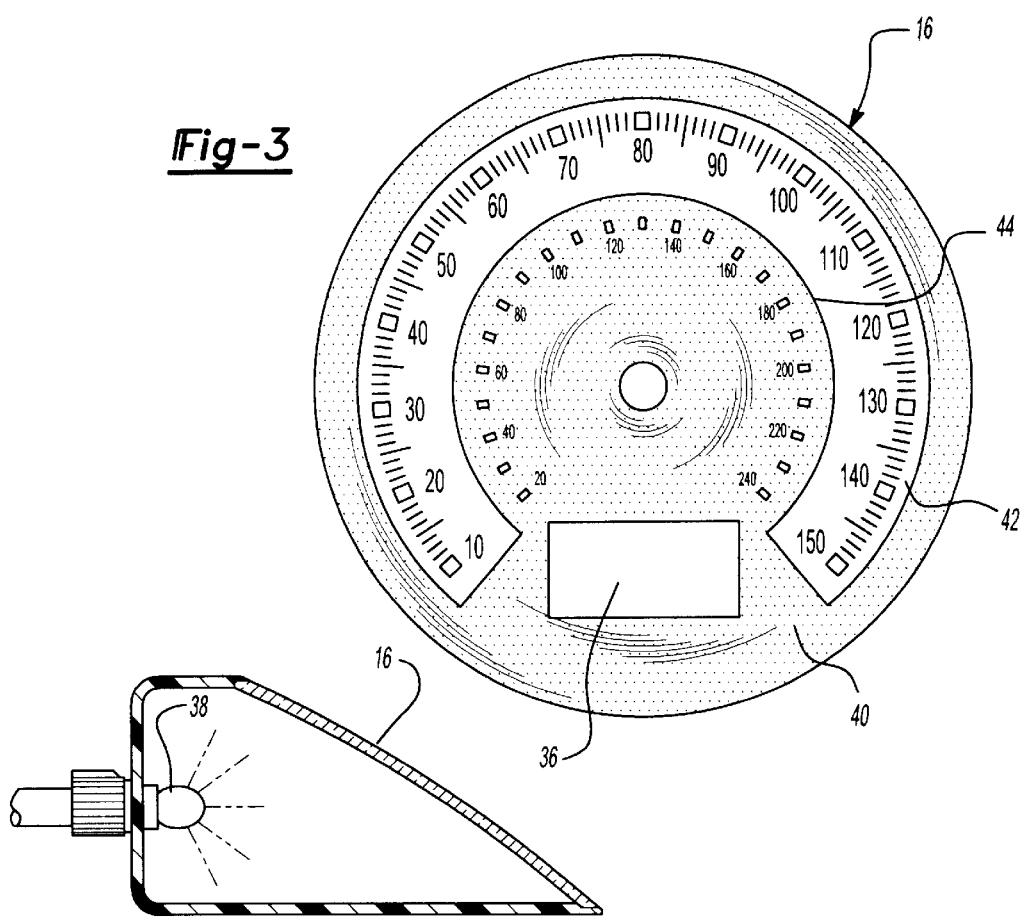
Fig-3
Fig-4
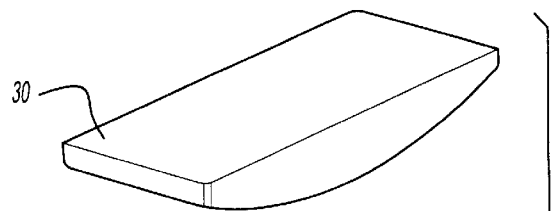
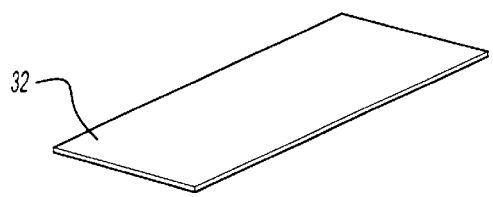
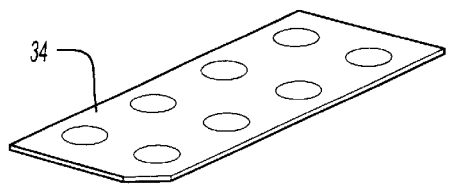
Fig-5

AUTOMOTIVE DISPLAY PANEL

BACKGROUND OF THE INVENTION

This invention relates to automotive display panels, and, more particularly, to an improved vehicle information panel for use in automotive dashboards.

Various types of vehicle information panels have been developed for the purpose of meeting customer demands with respect to styling and visibility. Automotive display panels in dashboards also need to be made from a combination of materials that are able to survive automotive quality control requirements at affordable pricing.

In connection with styling, known automotive display panels do not provide an aesthetically striking appearance. Instead, the appearances for many of the existing automotive display panels are lacking in aesthetic appeal. It is, therefore, an object of the invention to provide a more aesthetically attractive panel while improving the visibility of the information displayed.

Automotive display panels are currently decorated for day and night displays. The decoration typically includes a black background with information printed on the black background in a desired color, typically white. The decoration on the panel may include other colors that are different from the daytime white such that the panel information is visible at night as a result of lighting.

Other known automotive display panels have deficiencies, such as cost. There has been a need for alternative automotive display panels to satisfy styling and quality control requirements at competitive pricing.

While various types of automotive display panels have been developed with a view to meet demands of vehicle users, these attempts have not produced satisfactory results. For example, one approach involves fluorescent or pigmented inks that are applied to the indicating portions of the display, such as patterns and characters. The fluorescent material then radiates light with a specific color in response to illumination of light on the display. Nevertheless, these prior techniques do not produce satisfactory results because the indicating portions lose sharpness under certain conditions. Further, these known automotive displays fail to meet the vehicle users' demands for styling, especially in high-end vehicles.

In other areas, such as marketing, displays have been designed to increase the appeal of the products and to make the products more attractive to potential purchasers. For example, fanciful displays and designs have been used on cards, packaging materials, labels and the like to enhance the appeal of these products. A large number of techniques exist for forming desired designs on a panel substrate. One of these techniques, printing, has been used to deposit a large number of small, closely spaced colored dots onto the substrate. The desired image is formed on the substrate by depositing the dots in a predetermined pattern. It has also been recognized that printed displays can be enhanced by depositing a thick layer of colored material on the substrate. Nevertheless, these known techniques in marketing suffer the same disadvantages and drawbacks that have existed in automotive display panels.

Since, in the automotive industry, automobile stylists and designers are continually seeking ways for differentiating a vehicle's appearance, it is an object of the present invention to provide an automotive display panel which is different in styling from existing designs. Moreover, it is an object of the present invention to avoid the aforementioned disadvantages and problems associated with existing automotive display panels.

SUMMARY OF THE INVENTION

In accordance with this invention, a display for automotive instrumentation is provided which satisfies styling and quality control requirements at competitive pricing.

The present automotive display panel has a metallic appearance even though the primary substrate is a plastic material. The process for making the automotive display panel begins with a plastic sheet stock. A color-tinted metallic or holographic film is deposited on the base plastic sheet. This metallic layer is applied with certain indicia, such as tick marks and digits reversed out. A layer of neutral density ink is then applied on the metallic layer to provide the indicia with a predetermined appearance. Thereafter, a chrome layer may be applied to the plastic sheet by using a process such as heat transfer or lamination.

After adding the chrome layer, the display will have a mirror appearance on any area where the chrome has been applied. It is desirable to provide a metallic appearance to the display with a "star burst" effect at selected areas on the display. This effect is generated by depositing finely configured lines in clear or color-tinted transparent ink. These configured lines include concentric circles, radial lines, herringbone designs or combinations of various configured lines. The depositing of very fine configured lines creates a glistening effect that is aesthetically appealing to the vehicle operator. Further, the automotive display meets the demands of vehicle users from a visibility perspective.

Another step in the formation of the automotive display panel includes creating a three-dimensional appearance. One technique for accomplishing this appearance is to emboss or form any desired area on the display to create the desired three-dimensional appearance. Finally, the last step of the manufacturing process for the automotive display involves cutting the display into its final desired shape.

In accordance with the present invention, the colors, flat metallic appearance and indicia, such as digits, are applied to the stock material by screen-printing. Silver, gold, color-tinted chrome finish and holographic finish are formed by depositing metallic or holographic film on the base stock sheet by either heat stamping or lamination. Silver, gold or tinted chrome finish can also be obtained using a metallic-based ink that is applied in the same way as other screen printing inks. As set forth previously, the "star burst" effect is created by depositing very fine configured lines in clear or color-tinted ink.

The present invention provides an automotive display panel with a metallic appearance using a plastic substrate material. The display panel is backlit for illuminating the information on the display panel, particularly at nighttime. If the display panel was made of metal, having a metallic appearance that appeals to vehicle users, the panel would have to be front-lit and would not be as effective because of the glare generated by the brushed metal surface. Thus, the present invention avoids the problems associated with using a metal automobile display panel while at the same time reducing weight and cost.

The foregoing and other advantages and features of the invention will be more apparent from the following description when taken in connection with the accompanying drawings.

BRIEF DESCRIPTION OF THE DRAWINGS

FIG. 3 is an illustration of another embodiment of an automotive instrument dial or panel made in accordance with the present invention.

FIG. 4 is an illustration of backlighting the automotive display panel made in accordance with the present invention.

FIG. 5 is a schematic view of a forming step in the process of manufacturing an automotive display panel in accordance with the present invention.

DETAILED DESCRIPTION OF THE INVENTION

Figure 1:
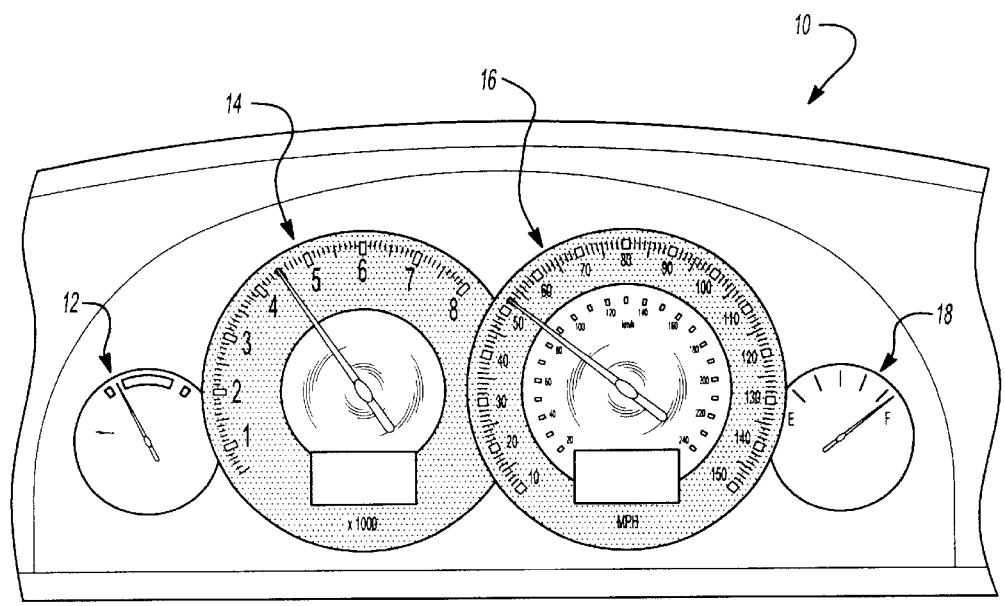
FIG. 1 is an illustration of an automobile display panel having a plurality of instrument dials made in accordance with the present invention.

FIG. 1 illustrates an automotive display panel 10 made in accordance with the present invention. As illustrated, the automotive display panel includes individual instrument dials 12–18, which display information regarding speed, RPM and other information regarding a vehicle's operation.

Figure 2:
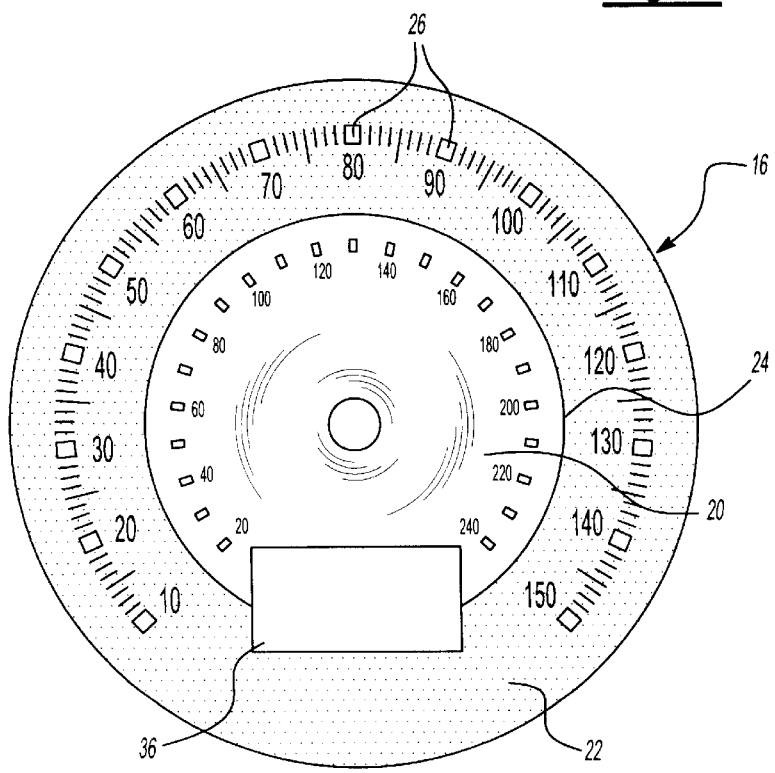
FIG. 2 is an illustration of one embodiment of an automotive instrument dial or panel made in accordance with the present invention.

FIG. 2 illustrates one of the instrument dials 16 made in accordance with the present invention. As will be described in more detail, the instrument display 16 includes a central area 20, which is surrounded by peripheral area 22. The third area on instrument dial 16 to be discussed includes chamfer ring 24 and mile tick marks 26.

The process for making automotive display 16 begins with a plastic material sheet, which is preferably clear. In one embodiment, area 22 on display 16 is screen-printed with a layer of silver ink having mile digits and tick marks reversed out. This provides area 22 with a flat metallic appearance. Then, a layer of neutral density ink is applied to the mile digits and minor tick marks to provide them with a dark appearance during the day. Since the neutral density ink is semi-transparent, the numbers and tick marks may be backlit such as shown in FIG. 4 for nighttime visibility.

The process for forming area 20 may begin with a thin metal or holographic layer deposition. This provides a mirror or holographic finish. Thereafter, tinted color may be screen-printed on top of the deposited metal or a holographic layer may be applied. The latter step provides a glossy finish with a desired color or desired holographic patterns. For a different aesthetic look, a chrome layer may be applied by using a process such as heat transfer. If a chrome ink is applied by heat transfer to area 20, the instrument display 16 will have a mirror appearance at area 20.

After creating a metallic-looking finish, finely configured lines, such as fine concentric circles or radial lines, are applied to area 20 with either a clear or tinted ink for the purpose of creating a "star burst" appearance. The finely configured lines of ink may be applied to the area 20 using conventional screen-printing or offset printing.

After the printing is completed on the plastic substrate forming display 16, the display may be embossed or dented at a desired area to provide a three-dimensional appearance. For example, the plane of area 20 may be displaced relative to the plane of area 22, thereby creating the chamfer ring 24 and a multi-level appearance.

FIG. 5 provides a schematic representation of one way for forming the multi-level or three-dimensional appearance for display 16. A pressure bladder 30 presses a stock sheet 32 against a forming tool 34 to obtain the desired shape. As will be apparent to those skilled in the art, the plastic stock sheet 32 includes a plurality of instrument dials or displays 16. Similarly, the forming tool 34 includes a plurality of receptacles for receiving each area 20 from each display 16 on stock sheet 32, thereby creating a multi-level or three-dimensional appearance for each display 16.

The last step in the procedure is cutting the printed dials 16 from the stock sheet 32. During the cutting step, any windows, such as window 36, are cut to provide for display of, for example, the odometer.

FIG. 4 illustrates, schematically, the backlighting of display 16. A light source 38, which may include LEDs, is provided for backlighting the display 16. If the automotive display 16 was made of metal, it would not be possible to backlight it. However, the display 16 provides a metallic appearance on a clear plastic substrate, thereby allowing it to be backlit.

FIG. 3 illustrates an alternative embodiment of the present invention. In this embodiment, automotive display panel 16 may be divided into areas 40, 42 and 44. Area 40 is defined by the darkened surface in FIG. 3. The horseshoe area 42 is displaced from area 40 for creating a multi-level or three-dimensional appearance. The perimeter of the horseshoe area 42 is identified as 44. In the embodiment of the invention illustrated in FIG. 3, area 40 includes a "star burst" appearance while area 42 has a brushed metal appearance. The perimeter of the horseshoe area 42 has a glossy metallic appearance or holographic appearance for the purpose of highlighting the horseshoe area 42.

The process for making the embodiment of the invention illustrated in FIG. 3 is generally similar to the process described in connection with FIG. 2. The process begins with a clear plastic substrate. A color layer, such a blue, is then printed on the substrate with the kilometer numbers, tick marks and areas 42 and 44 reversed out. This creates the area which is identified in FIG. 3 as 40.

Thereafter, a chrome ink layer is printed on the substrate with the mile numbers and tick marks reversed out. The chrome ink layer forms the area which is identified in FIG. 3 as 42. A layer of neutral density ink is deposited behind the hollow mile numbers and tick marks in area 42 to provide a dark appearance during the day, which can be backlit at night. A layer of white translucent ink is then deposited behind the kilometer numbers and tick marks in area 40 to provide a light appearance during the day and a translucent surface for being backlit at night.

Subsequent to the preceding steps, a dark layer of ink is placed over the entire surface area of display 16, except at the numbers and tick marks for mile and kilometer designations. This provides an opaque appearance for the surface area.

The next step in the process is to generate a brushed metal appearance in area 42. Finely configured lines in the form of concentric circles, for example, are printed on area 42 in lightly neutral density ink using screen-printing. This provides an appearance similar to brushed metal. The desired appearance can also be achieved by combining configured lines. For example, the concentric circles may be deposited on finely applied linear lines to create the simulation of brushed metal.

A glossy metallic foil or holographic foil can thereafter be deposited on the perimeter 44 of the horseshoe area 42. After the deposition of the foil, finely configured lines, such as concentric circles or radial lines, are printed on area 40 to create the "star burst" appearance as previously described.

After the printing is completed, the display 16, illustrated in FIG. 3, is embossed for creating a three-dimensional appearance at area 42. Finally, the instrument dial display 16 is cut from the stock sheet 32 and the display window 36 is similarly cut away.

Silver, gold or other color-tinted chrome ink finishes and holographic finishes may be created by depositing metallic or holographic film on the clear plastic base sheet. The areas having a metallic appearance, digits or color are formed by conventional screen-printing. As described previously, the "star burst" appearance is generated by depositing finely configured lines, such as concentric circles or radial lines, on the surface in clear or color-tinted transparent ink. This may be accomplished by conventional screen-printing or offset printing. For the purposes of the present invention, a holographic film of any type known in the pertinent art may be used in the areas identified as 20 in FIG. 2 and 40 in FIG. 3. If holographic film is applied to the clear plastic substrate, the backlit appearance would provide another "look" that could be used in addition to, or instead of, the previously described metallic appearance.

It is to be understood that the above-described embodiments are merely illustrative of the principles of the present invention. Other embodiments can be devised by those skilled in the art without departing from the scope of the invention.

What is claimed:

1. An instrument dial, having a metallic appearance, for an automotive display panel comprising:
   (a) at least one substrate made of a plastic material;
   (b) a metallic film or ink applied to a predetermined area on the substrate;
   (c) finely configured lines printed on the film or ink; and
   (d) the substrate being backlit for illuminating the panel.

2. The instrument dial as defined in claim 1, wherein the configured lines include concentric circles, radial lines, herringbone designs or combinations of various configured lines.

3. The instrument dial as defined in claim 2, wherein the dial is formed into a multi-level configuration for providing a three-dimensional appearance.

4. The instrument dial as defined in claim 1, wherein the substrate includes a central area surrounded by a peripheral area with each area containing indicia.

5. The instrument dial as defined in claim 4, wherein a color layer is printed on the substrate in one or more of the areas.

6. The instrument dial as defined in claim 5, wherein a holographic foil or film is applied to the substrate.

7. An instrument dial for an automotive display panel comprising:
   (a) a plurality of clear plastic substrates with each substrate having an ink or foil applied thereto in predetermined areas;
   (b) each area of the substrates having digits or identifying marks imprinted thereon;
   (c) finely configured lines applied by printing to selected areas on the substrates to provide a desired appearance;
   (d) the substrates having a multi-level configuration for providing a three-dimensional appearance; and
   (e) lighting means for illuminating the clear plastic substrates.

8. The instrument dial as defined in claim 7, wherein at least one layer of neutral density ink is applied to the digits and identifying marks to provide a dark appearance during the day.

9. The instrument dial as defined in claim 7, wherein a holographic layer is selectively applied to one or more of the substrates.

10. The instrument dial as defined in claim 7 wherein the finely configured lines include concentric circles, radial lines and combinations thereof.

11. An instrument dial of an automotive display panel, comprising:
    (a) at least one substrate made of a plastic material;
    (b) a silver ink layer applied to a first predetermined area on the substrate;
    (c) a metallic layer applied to a second predetermined area on the substrate; and
    (d) a plurality of finely configured lines printed on said metallic layer,
    (e) wherein said instrument dial is embossed so that said first predetermined area is at a different level than said second predetermined area.

12. The instrument dial of claim 11, wherein said metallic layer comprises a holographic layer.

13. The instrument dial of claim 11, wherein said silver ink layer includes digits and identifying marks that are reversed or etched out of the silver ink layer, with a semi-transparent neutral density ink then applied to said digits and identifying marks.

14. The instrument dial of claim 11, wherein said substrate is backlit to illuminate said dial.

* * * * *